March 14, 1933.  F. M. COSSALTER  1,901,227

VEHICLE BUMPER

Filed March 19, 1932

INVENTOR
Frank M. Cossalter
BY
ATTORNEY

Patented Mar. 14, 1933

1,901,227

UNITED STATES PATENT OFFICE

FRANK M. COSSALTER, OF GOLDBAR, WASHINGTON

VEHICLE BUMPER

Application filed March 19, 1932. Serial No. 599,999.

This invention relates to improvements in vehicle bumpers and more particularly to such bumpers as are used on automobiles, trucks and the like. The principal object of the invention is to provide a bumper for such use, through which, upon forcible contact of the bumper with an automobile or other object, there is not so much likelihood of the machine which is equipped with my improved bumper veering to the right or left, oftentimes with resultant damage to other machines; but on the contrary, my improved bumper will collapse and cushion the blow, no matter in what direction the force of the blow is directed upon the bumper.

These and other objects will appear as the invention is more fully hereinafter described in the following specification, shown in the accompanying drawing and finally pointed out in the appended claim.

In the drawing, Fig. 1 is a top view of my device partly in section.

Figure 2:
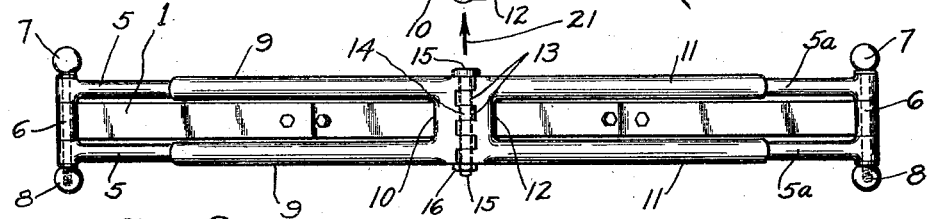
Fig. 2 is a front view.

Referring now more particularly to the drawing, reference numeral 1 indicates the back portion of the bumper preferably of spring steel, bent into the shape shown and to which are bolted brackets 2 by means of bolts 3. The ends of back portion 1 are formed into eyes 4 to which are hinged rods 5 and 5—a, by means of bolt 6, of which 7 is an ornamental head and 8 an ornamental nut, (Fig. 2). 9 are tubular members joined together at 10, and 11 are similar tubular members joined together at 12. The joined portion 10 of the tubular members 9 and the joined portion 12 of tubular members 11 are dovetailed as shown at 13 and perforated vertically as at 14 and hinged together by means of bolts 15 and nut 16. Inside of the tubular members 9 and 11 are inserted compression springs 17 and 18 respectively.

Figure 1:
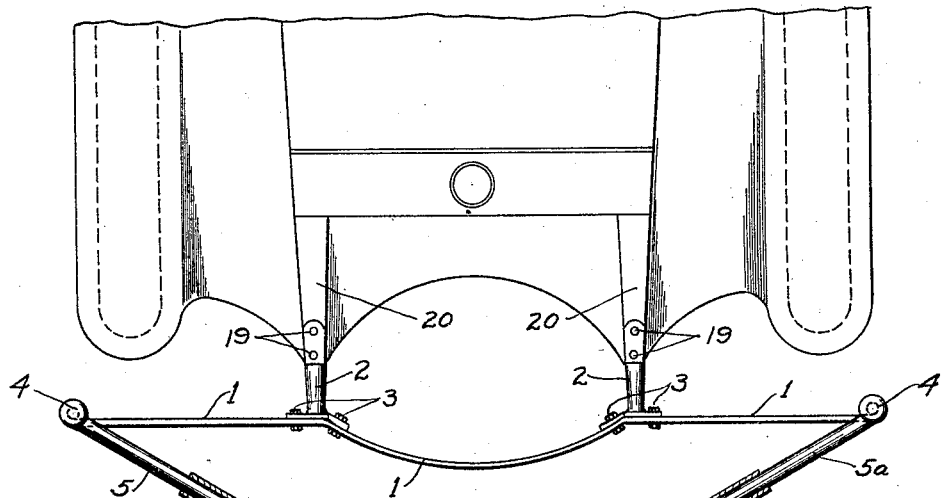

The tubular members 9 are now slipped over rods 5 and tubular members 11 over rods 5—a as shown in Fig. 1. The holes in tubes 9 and 11 are large enough so as to slide easily upon rods 5 and 5—a. The entire bumper as a unit is secured by means of its brackets 2, to the chassis 20 of an automobile, being bolted or riveted thereto as shown at 19.

It will be observed that the tubular members 9 may slide on rods 5 independently of any sliding movement of tubes 11 on bars 5—a, or tubular members 11 may slide on 5—a independently of any sliding motion of tubes 9 on rods 5.

Figure 3:
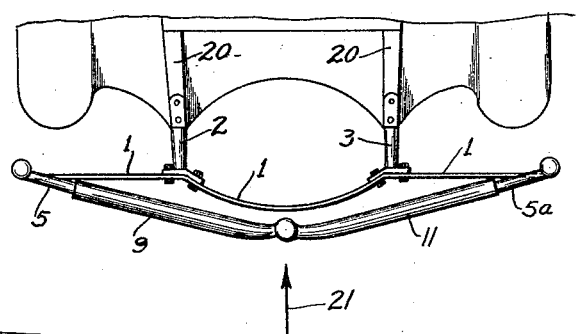
Fig. 3 is a plan view showing the bumper collapsed by an impact from straight ahead.

The method of operation is as follows: Supposing an impact or pressure from straight ahead as indicated by arrow 21, (Figs. 1 and 3) should occur, the pressure or strain will be uniformly distributed on both sides of the bumper thus causing an equal pressure upon springs 17 and 18, (Fig. 1), and also an equal telescoping action of rods 5 with tubes 9 and rods 5—a with tubes 11; in other words the hinged ends of the two sets of tubular members will be forced straight back and the whole bumper assume a position as shown in Fig. 3.

Figure 4:
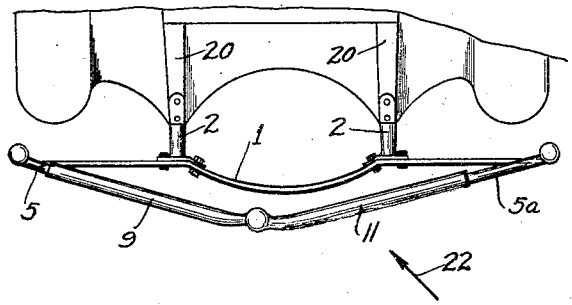
Fig. 4 is a similar view showing the bumper collapsed from a different angle.

If an impact or pressure is brought to bear on one side of the bumper as shown by arrow 22, (Figs. 1 and 4), it will be observed that a greater pressure or strain will be imposed upon springs 17 than on springs 18, causing a greater telescoping action of rods 5 with tubes 17 than of rods 5—a with tubes 11; in other words the bumper will take the position as shown in Fig. 4. It will be understood of course that an impact can occur from almost any angle whatsoever, and the energy of it be absorbed by either set of springs 17 or 18, or divided to a varying degree between them, the result being that almost any angle of impact may be taken care of without bending or distorting of any individual members of the bumper, but merely compressing the springs 17 and 18.

While I have shown and described a particular form of embodiment of my invention, I am aware that many minor changes will readily suggest themselves to those skilled in the art without departing from the spirit and scope of my invention. I therefore desire to avoid being limited to the particular form of embodiment which I have hereinabove shown and described.

Having described my invention, what I claim as new and desire to protect by Letters Patent is:

In a vehicle bumper the combination of a pair of tubular members having one of each of their ends hinged together, a rod slidable within the free end of each of the tubular members, means for pivotally securing the projecting end of each rod to the chassis of a vehicle so that said projecting ends are in spaced relation with respect to each other, a spring within each tubular member and between its rod and the hinge point of the said tubular members whereby the action of said springs normally preserves the entire assembly in V-shaped formation so that a blow upon the said hinge point of the tubular members will cause both tubular members to slide toward the pivotal connections between the rods and the chassis, and a blow upon either of the tubular members will cause the other tubular member to slide towards the pivotal connection between its rod and the chassis.

In testimony whereof I affix my signature.

FRANK M. COSSALTER.